US011060838B2

(12) United States Patent
Kiyotani et al.

(10) Patent No.: US 11,060,838 B2
(45) Date of Patent: Jul. 13, 2021

(54) COORDINATE MEASURING MACHINE

(71) Applicant: Mitutoyo Corporation, Kawasaki (JP)

(72) Inventors: Shingo Kiyotani, Utsunomiya (JP);
Yoshikazu Ooyama, Mooka (JP);
Takao Oneta, Haga-gun (JP)

(73) Assignee: Mitutoyo Corporation, Kawasaki (JP)

(*) Notice: Subject to any disclaimer, the term of this patent is extended or adjusted under 35 U.S.C. 154(b) by 90 days.

(21) Appl. No.: 16/655,402

(22) Filed: Oct. 17, 2019

(65) Prior Publication Data

US 2020/0124394 A1   Apr. 23, 2020

(30) Foreign Application Priority Data

Oct. 23, 2018 (JP) .............................. JP2018-198889

(51) Int. Cl.
*G01B 5/008* (2006.01)
*B25J 9/10* (2006.01)

(52) U.S. Cl.
CPC .............. *G01B 5/008* (2013.01); *B25J 9/104* (2013.01)

(58) Field of Classification Search
CPC ...................................................... G01B 5/008
USPC ........................................................... 33/503
See application file for complete search history.

(56) References Cited

U.S. PATENT DOCUMENTS

| 4,924,598 A * | 5/1990 | Gruhler .................. G01B 3/008 33/503 |
| 5,130,523 A * | 7/1992 | Raleigh ................. G01B 11/005 250/202 |
| 6,158,136 A * | 12/2000 | Gotz ....................... G01B 3/008 33/503 |
| 10,088,023 B2 | 10/2018 | Tamura |
| 2012/0173193 A1* | 7/2012 | Chang .................. G01B 11/005 702/150 |
| 2013/0143705 A1* | 6/2013 | Wolf ........................ F16G 3/08 474/202 |

(Continued)

FOREIGN PATENT DOCUMENTS

| JP | 2016-090052 A | 5/2016 |
| JP | 2018-080979 A | 5/2018 |

*Primary Examiner* — George B Bennett
(74) *Attorney, Agent, or Firm* — Oblon, McClelland, Maier & Neustadt, L.L.P.

(57) ABSTRACT

There is provided a movement mechanism including a Z spindle the posture of which is hardly changed when the Z spindle is moved upward and downward, and having less measurement errors due to hysteresis.

A movement mechanism includes a Z-axis movement mechanism and an X-axis movement mechanism that moves the Z-axis movement mechanism in the horizontal direction. The Z-axis movement mechanism includes a Z spindle having a length in the vertical direction and a Z-axis drive unit that moves the Z spindle in the vertical direction. The Z-axis drive unit includes an open belt having an upper end fixed near an upper end portion of the Z spindle, and a lower end fixed to near a lower end portion of the Z spindle, a drive pulley around which the open belt wounded and that feeds and drives the open belt upward and downward, an upper tension roller that pushes the open belt against the Z spindle, and a lower tension roller that pushes the open belt against the Z spindle. A frame part of the X-axis movement mechanism supports the Z-axis drive unit at a position facing an X-axis guiding part by interposing the Z spindle.

5 Claims, 12 Drawing Sheets

(56) References Cited

U.S. PATENT DOCUMENTS

| | | | |
|---|---|---|---|
| 2015/0260499 A1* | 9/2015 | Raiteri | G01B 21/047 |
| | | | 33/503 |
| 2016/0216098 A1* | 7/2016 | Hediger | G01B 5/008 |
| 2016/0305777 A1* | 10/2016 | Racine | G05B 19/401 |
| 2017/0097220 A1* | 4/2017 | Oneta | G01B 5/008 |
| 2017/0227050 A1* | 8/2017 | Poglitsch | F16C 32/0625 |
| 2018/0135956 A1 | 5/2018 | Takesako | |
| 2018/0149473 A1* | 5/2018 | Sprenger | G05B 19/402 |
| 2018/0252302 A1* | 9/2018 | Kimura | F16H 19/025 |
| 2018/0305130 A1* | 10/2018 | Kiyotani | B65G 15/30 |
| 2021/0033377 A1* | 2/2021 | Ishii | G01B 5/008 |

\* cited by examiner

Fig. 1

RELATED ART

RELATED ART

Fig.5

RELATED ART

COORDINATE MEASURING MACHINE

INCORPORATION BY REFERENCE

This application is based upon and claims the benefit of priority from Japanese patent application No. 2018-198889, filed on Oct. 23, 2018, the disclosure of which are incorporated herein in its entirety by reference.

BACKGROUND OF THE INVENTION

1. Field of the Invention

The present invention relates to a coordinate measuring machine. The present invention particularly relates to a coordinate measuring machine employing, as a drive mechanism in a vertical direction, a belt drive mechanism using an open belt.

2. Description of Related Art

Open-belt-type axial-direction movement apparatuses have been known (JP 2016-90052 A). The applicant has proposed a coordinate measuring machine to which an open-belt-type axial direction movement apparatus is applied (JP 2018-80979 A).

Figure 1:
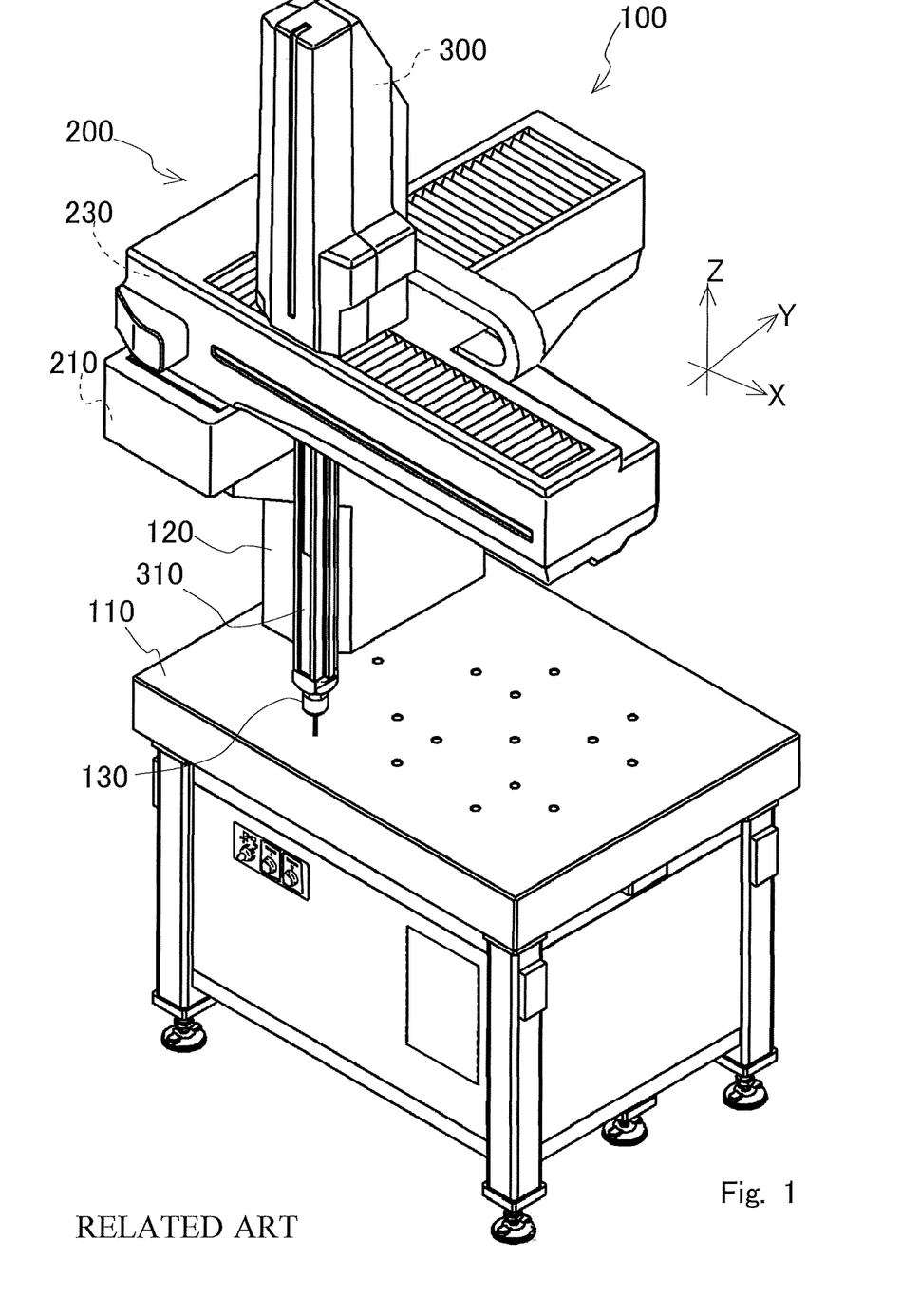
FIG. 1 is a perspective view of an appearance of a coordinate measuring machine.

FIG. 1 is a perspective view showing an appearance of a coordinate measuring machine 100.

The coordinate measuring machine 100 includes a base 110, a Y-axis column 120, a probe 130, and a movement mechanism 200. The base 110 is used to place an object to be measured thereon. The Y-axis column 120 is provided so as to stand on the base 110. The probe 130 detects the position of an object to be measured. The movement mechanism 200 moves the probe 130 in XYZ directions orthogonal to each other.

The Y-axis column 120 is wide in the Y direction and narrow in the X direction, and is provided so as to stand at one edge in the X direction on a top surface of the base 110. The Y-axis column 120 has a substantially T shape. The upper end portion of the Y-axis column 120 is longer than one side of the base 110, and the lower end portion of the Y-axis column 120 is shorter than one side of the base 110.

The probe 130 is, for example, a contact probe having its tip as a ball. However, the probe 130 is not limited thereto, and may be a noncontact probe.

Figure 2:
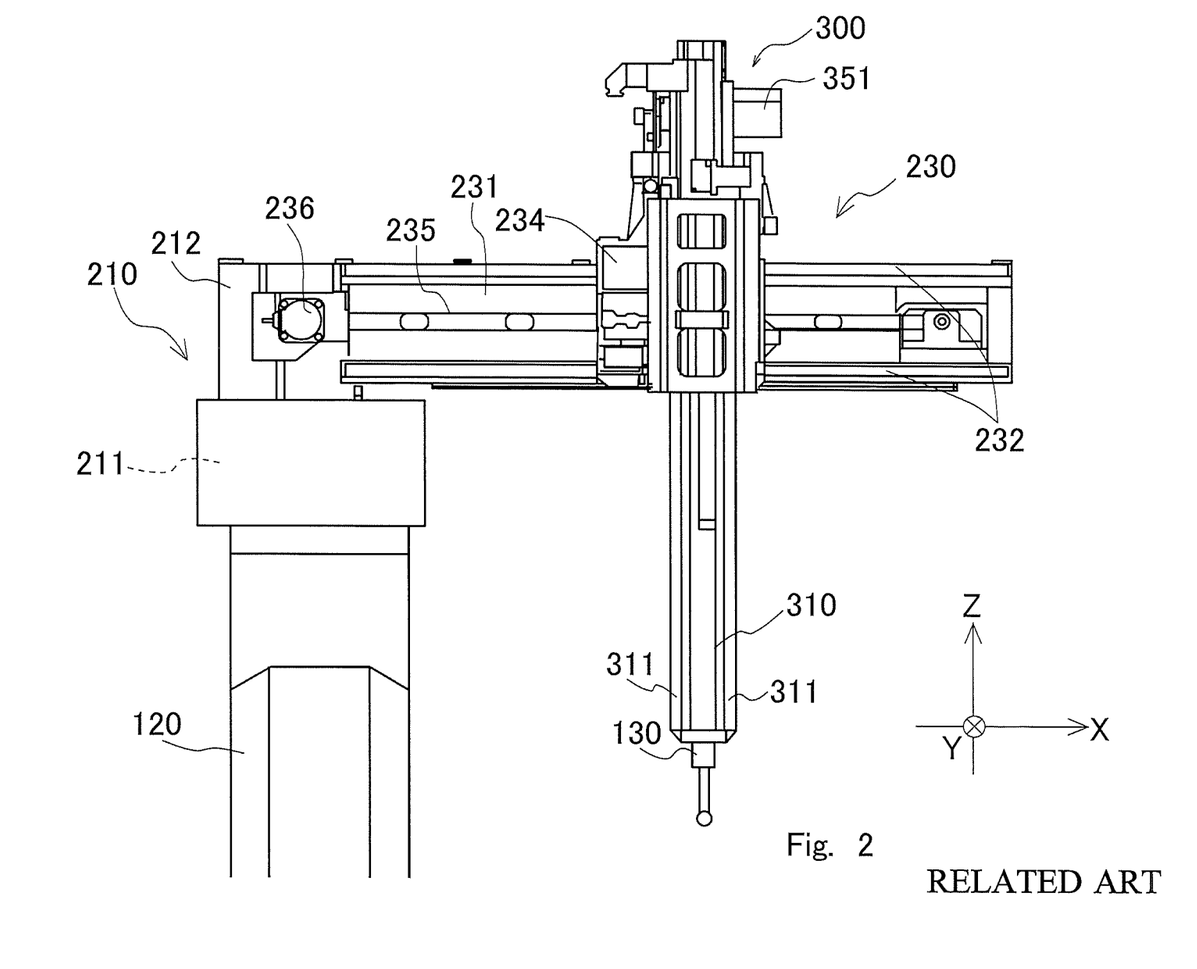
FIG. 2 is a front view of the coordinate measuring machine and shows an X-axis movement mechanism without a cover.
Figure 3:
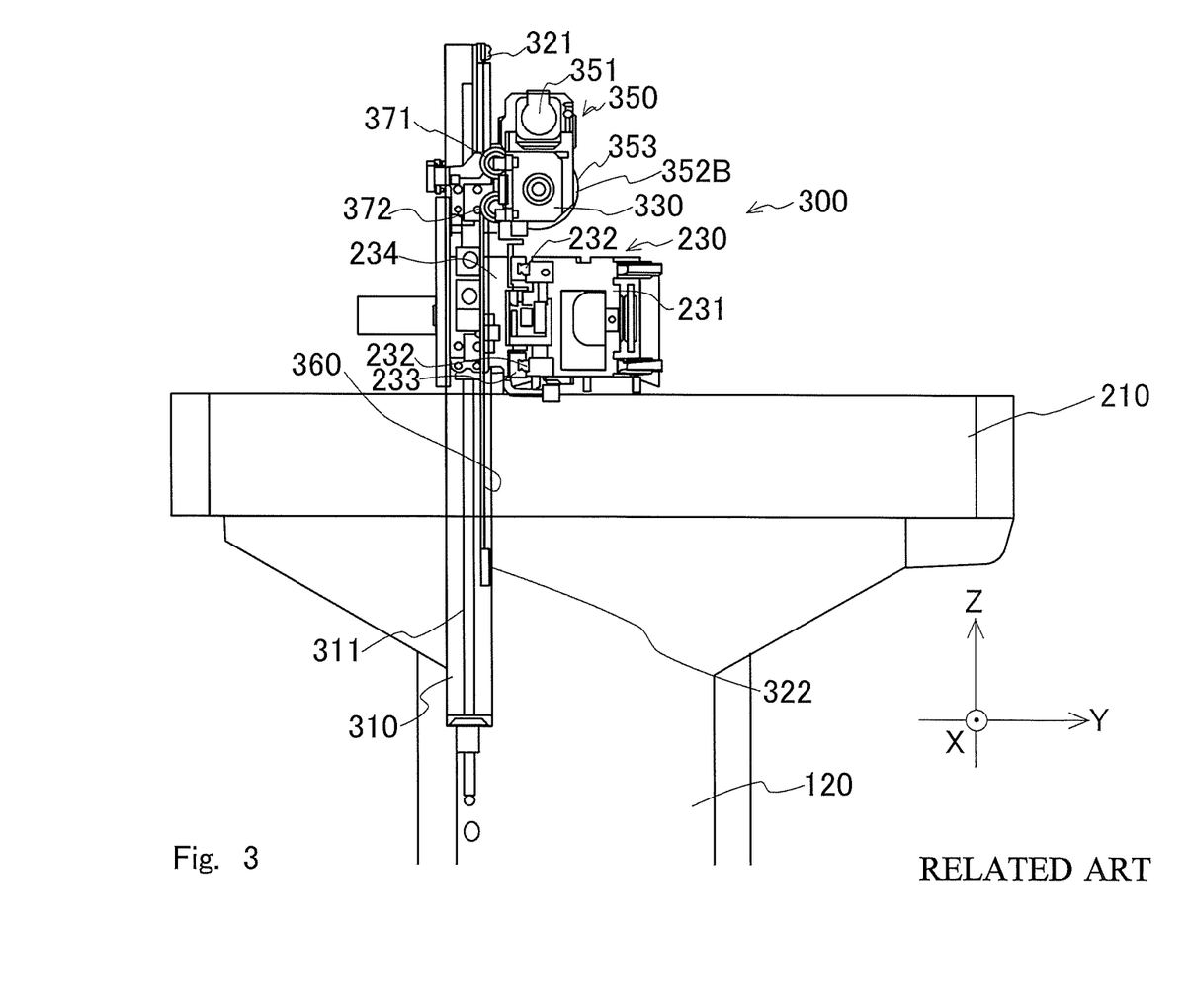
FIG. 3 is a side view of the coordinate measuring machine and shows the X-axis movement mechanism and a Z-axis movement mechanism without covers.

The movement mechanism 200 is installed on the Y-axis column 120. With reference to FIGS. 2 and 3, a configuration of the movement mechanism 200 is roughly described. FIG. 2 is a front view of the coordinate measuring machine 100, and shows an X-axis movement mechanism 230 without a cover. FIG. 3 is a side view of the coordinate measuring machine 100, and shows the X-axis movement mechanism 230 and a Z-axis movement mechanism 300 without covers.

The movement mechanism 200 includes a Y-axis movement mechanism 210, an X-axis movement mechanism (horizontal movement mechanism) 230, and a Z-axis movement mechanism 300.

The Y-axis movement mechanism 210 includes a Y-axis guide part 211 and a Y slider 212. The Y-axis guide part 211 is supported at an upper end portion of the Y-axis column 120. The Y slider 212 is provided so as to be movable in the Y direction using the Y-axis guide part 211.

The X-axis movement mechanism 230 includes an X-axis guiding part (horizontal guide part) 231 and an X slider (horizontal slider) 234. The X-axis guiding part (horizontal guide part) 231 is fixed to the Y slider 212. The X slider (horizontal slider) 234 is provided so as to be movable in the X direction using the X-axis guiding part 231. The X-axis guiding part 231 has a length in the X axial direction and one end fixed to the Y slider 212, and is supported in a cantilever manner. On the left side face (the surface on the negative side in the Y direction) of the X-axis guiding part 231, a pair of guide rails 232 is provided at the upper end edge and the lower end edge. A movement block 233 having a U-shaped cross section is provided so as to straddle the guide rail 232. The X slider 234 is attached to the movement block 233.

Although not described detailedly, as mechanisms for moving the Y slider 212 and the X slider 234, a ball screw mechanism and a belt drive mechanism can be employed. In this example of the X-axis movement mechanism 230, an endless belt 235 is fed and driven by power of a motor 236.

The Z-axis movement mechanism (vertical movement mechanism) 300 is supported on the X slider 234.

The Z-axis movement mechanism 300 includes a Z spindle (elongated slider) 310, a frame part 330, and a Z-axis drive unit (vertical drive unit) 350. The Z spindle (elongated slider) 310 is supported so as to be movable in the Z direction (vertical direction). The frame part 330 is fixed to the X slider 234, and supports the Z-axis movement mechanism 300. The Z-axis drive unit (vertical drive unit) 350 is supported by the frame part 330, and moves the Z spindle 310 in the Z direction.

The Z spindle (elongated slider) 310 moves in the Z direction, which is the vertical direction, and supports the probe 130 at the lower end portion. At both side faces (the surface on the positive side of the X axial direction and the surface on the negative side) of the Z spindle 310, a pair of guide rails 311 is provided so as to face each other. (Note that, the Z spindle 310 does not rotate but slides to move, but is referred to as a spindle used in general in this technical field.)

The frame part 330 is provided to the X slider 234 on the surface on the positive side in the Y axial direction. A movement block having a U-shaped cross section is provided to the frame part 330 so as to straddle the guide rails 311 that guides the Z spindle 310 in the Z direction.

The Z-axis drive unit 350 is supported by the frame part 330 fixed on the X slider 234. At this time, the Z-axis drive unit 350 is positioned right above the X-axis guiding part 231 as shown in FIG. 3, that is, is arranged at the frame part 330 to be on the same side as the X-axis movement mechanism 230. The reason that the Z-axis drive unit 350 is positioned right above the X-axis guiding part 231 is because the space efficiency is better when the protrusion of the Z-axis drive unit 350 is positioned on the same side as the X-axis guiding part 231. (The directions of the protrusions are aligned and the Z spindle 310 has no large protrusion on the surface on the negative side in the Y axial direction as shown in FIG. 3.) In addition, the reason that the Z-axis drive unit 350 is positioned not right below but right above the X-axis guide is because the Z-axis drive unit 350 is not to obstruct a space for arranging a workpiece, and the heat of the Z-axis drive unit 350 is to be released upward by separating the Z-axis drive unit 350 from the workpiece as far as possible.

Figure 4:
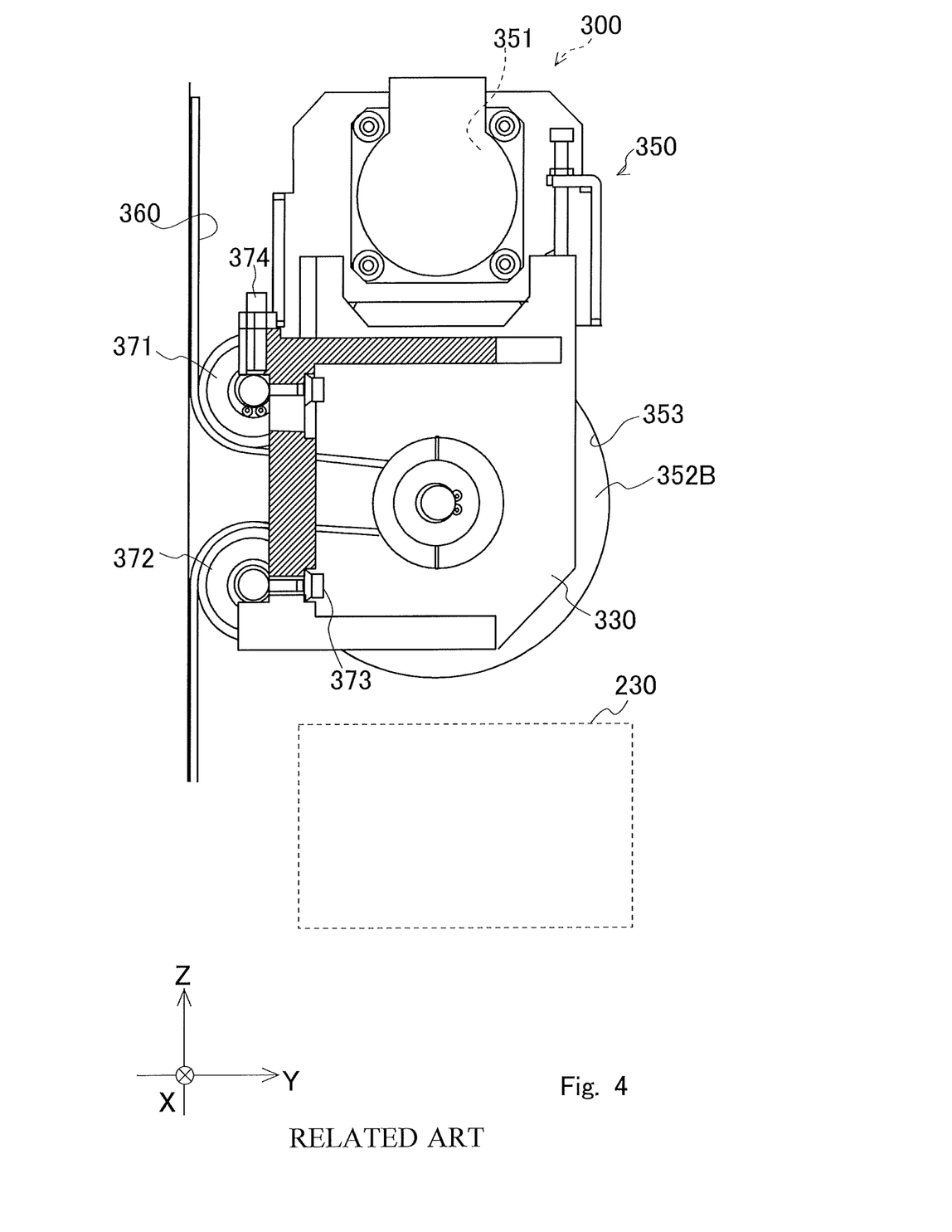
FIG. 4 is a enlarged view of a Z-axis drive unit.

FIG. 4 is an enlarged view of the Z-axis drive unit 350.

Figure 5:
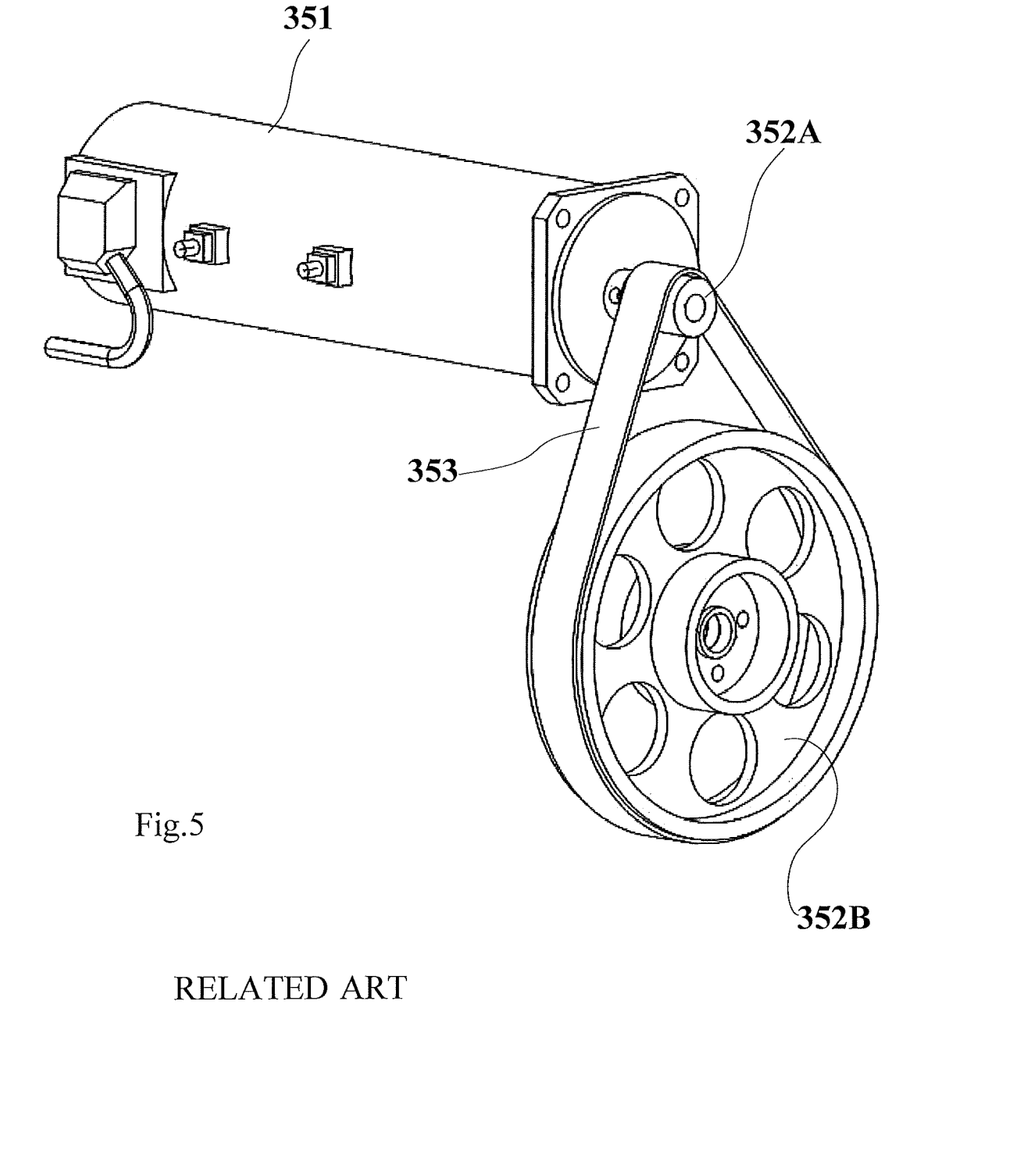
FIG. 5 is an extracted and enlarged view of a motor (Z rotation drive source), a first drive pulley, a second drive pulley, and an endless belt.

FIG. 5 is an extracted and enlarged view of a motor 351, a first drive pulley 352A, a second drive pulley 352B, and an endless belt 353. The Z-axis drive unit 350 includes a motor 351, a first drive pulley 352A, a second drive pulley 352B, an endless belt 353, an open belt 360, and tension rollers 371 and 372.

The first drive pulley 352A is attached to the shaft of the motor 351. The second drive pulley 352B rotates by following the first drive pulley 352A. The endless belt 353 couples the second drive pulley 352A and the second drive pulley 352B. The open belt 360 converts the rotation of the second drive pulley 352B into the up-and-down movement of the Z spindle 310. The tension rollers 371 and 372 adjust the tension of the open belt 360. Here, the diameter of the first drive pulley 352A is smaller than that of the second drive pulley 352B. Accordingly, the torque generated by the motor 351 is increased.

The rotation output of the motor 351 is transmitted by the endless belt 353 and rotationally drives the second drive pulley 352B. An output shafts provided at the shaft center of the second drive pulley 352B.

The both ends of the open belt 360 are fixed to a side face of the Z spindle 310. As shown in FIG. 3, the upper end portion of the open belt 360 is attached to the upper end portion of the Z spindle 310 with an upper end attachment part 321, and the lower end portion of the open belt 360 is attached near the lower end portion of the Z spindle 310 with a lower end attachment part 322. In addition, the open belt 360 is wound around the output shaft of the second drive pulley 352B, that is, the output shaft is positioned between the Z spindle 310 and the open belt 360.

The tension rollers 371 and 372 are arranged closer to the Z spindle 310 than the shaft center of the second drive pulley 352B in the Y axial direction. In addition, the tension rollers 371 and 372 are rotatably arranged at the frame part 330 so as to sandwich the output shaft in the Z axial direction. The positions of the tension rollers 371 and 372 in the Y axial direction are each adjusted by a bolt 373 to push the open belt 360 positioned on the negative side in the Y axial direction against the Z spindle 310.

Furthermore, the tension rollers 371 and 372 bring the open belt 360 into contact at a long distance using the circumference of the output shaft. That is, an adjustment screw 374 for pushing the shafts of the tension rollers 371 and 372 along the Z axial direction can be screwed into the frame part 330.

SUMMARY OF THE INVENTION

As described above, the Z-axis drive unit 350 includes a pair of tension rollers 371 and 372, and pushes the open belt 360 against the side face of the Z spindle 310 by adjusting the positions of the tension rollers 371 and 372. In this manner, the force applied at the end portion of the open belt 360 to the Z spindle 310 is to be parallel to the Z direction as much as possible so that the force to bend and incline the Z spindle 310 is not to be applied to the Z spindle 310. However, it is inevitable that the forces applied from the open belt 360 to the Z spindle 310 when the Z spindle 310 is moved upward and when the Z spindle 310 is moved downward are different.

The force Fb applied from the open belt 360 to the Z spindle 310 when the Z spindle 310 is moved upward is the sum of the force Fzacc to accelerate the Z spindle 310 in the upward direction and the force Fzg to support the weight of the Z spindle 310. The force Fb applied from the end portion of the open belt 360 to the Z spindle 310 when the Z spindle 310 is moved downward is the difference between the force Fzacc to accelerate the Z spindle 310 (in the downward direction) and the force Fzg to support the weight of the Z spindle 310. As described above, it is inevitable that the forces applied from the open belt 360 to the Z spindle 310 when the Z spindle 310 is moved upward and when the Z spindle 310 is moved downward are different, when an object is moved in the Z direction (vertical direction).

However, the present inventors found in the repeated verifications of the measuring accuracy of the coordinate measuring machine 100 that there was a range in which the difference (hysteresis) of measurement errors when the Z spindle 310 was moved upward and downward became large. The present inventors have speculated the reason as follows.

Figure 6:
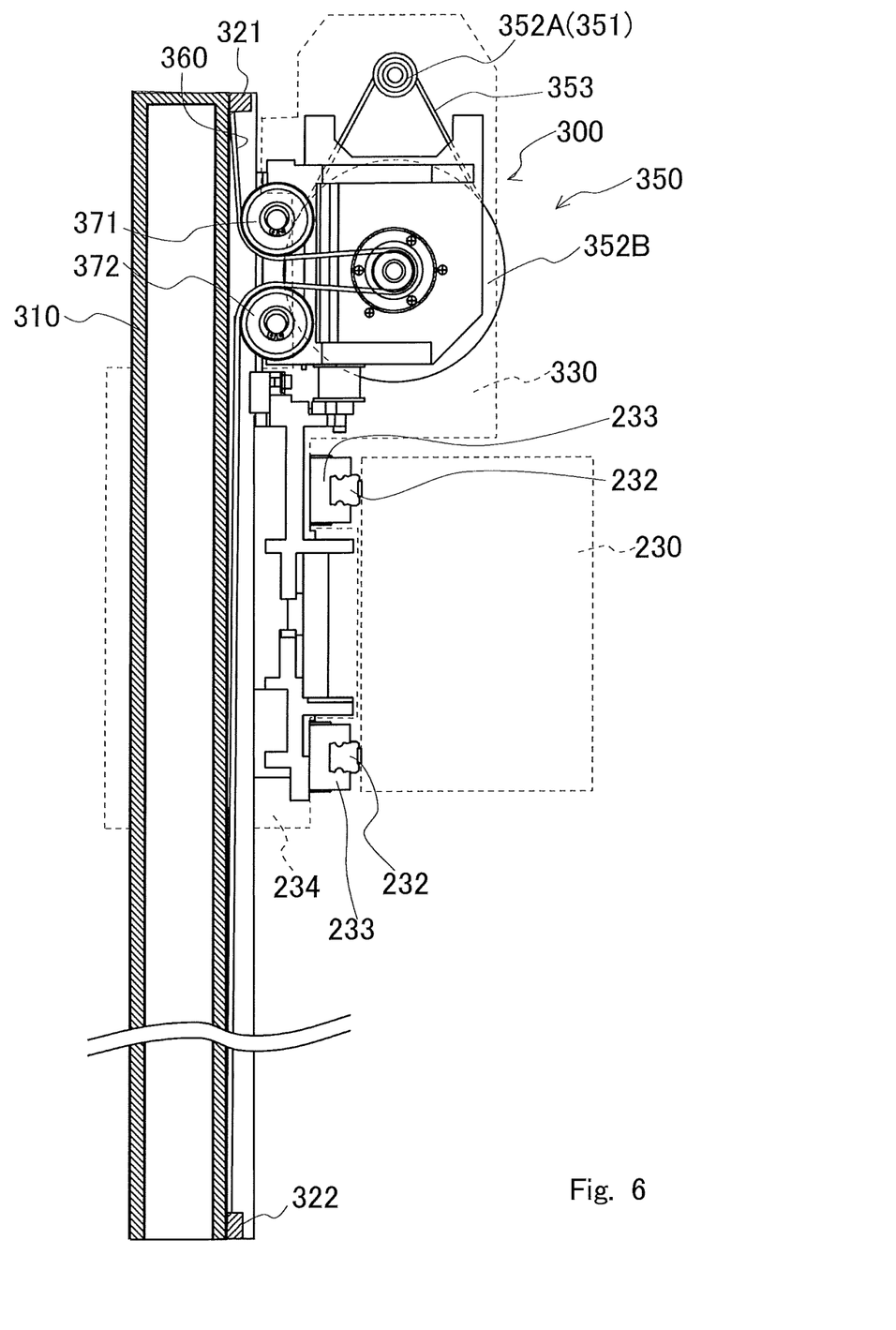
FIG. 6 is a diagram schematically showing the positional relation between an upper end attachment part of an open belt and an upper tension roller.
Figure 7:
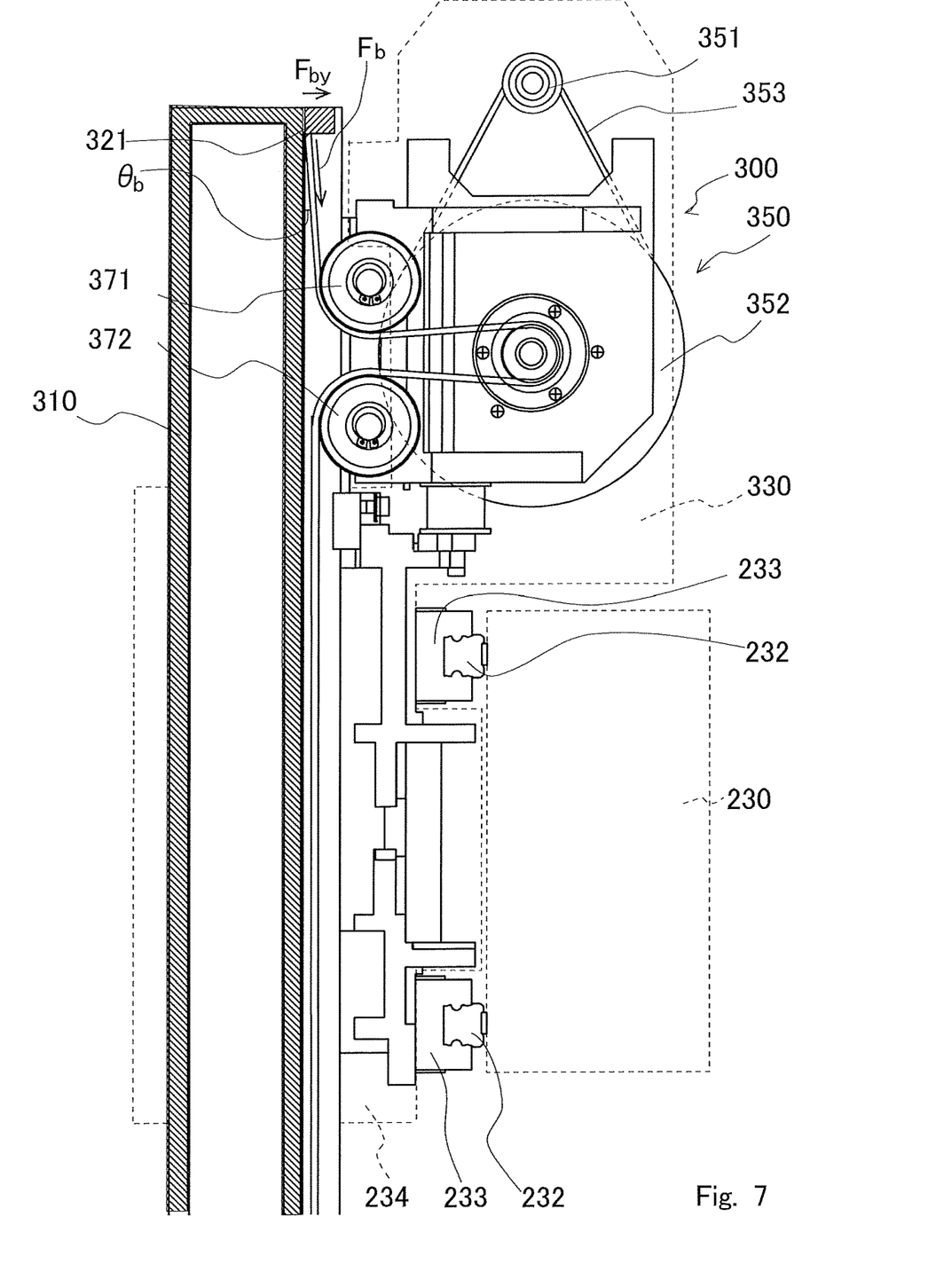
FIG. 7 is a partial enlarged view of FIG. 6.

Since the Z-axis drive unit 350 is arranged to be positioned right above the X-axis guiding part 231 as described above, the upper end attachment part 321 of the open belt 360 is considerably close to the upper tension roller 371 as schematically shown in FIG. 6 when the Z spindle 310 is moved to the lower stroke end. FIG. 7 is a partial enlarged view of FIG. 6. When the upper end attachment part 321 of the open belt 360 approaches the upper tension roller 371, an inclination angle θb of the open belt 360 from the vertical line is increased near the upper end attachment part 321.

Although the positions of the tension rollers 371 and 372 can be adjusted at assembling the product as described above, it is difficult to readjust the positions of the tension rollers 371 and 372 once the product has been assembled. Thus, it requires extensive work to adjust the tension of the open belt 360 and the positions of the tension rollers 371 and 372 after the product has been shipped. When the Z spindle 310 is moved upward from the lower stroke end, large force Fb (=Fzacc+Fzg) is applied to the open belt 360. If the inclination angle θb of the open belt 360 from the vertical line is large, the y direction component Fby (the force to draw the upper end attachment part 321 of the open belt 360 in the positive direction of the Y-axis (that is, toward the Z-axis drive unit 350)) of Fb is increased as shown in FIG. 7. Then, the Z spindle 310 can be bent or inclined. Since the magnitudes of Fb when a workpiece is measured near the lower stroke end of the Z spindle 310 while the Z spindle 310 is being moved downward and while the Z spindle 310 is being moved upward are different, the error becomes large.

An object of the present invention is to provide a movement mechanism including a Z spindle the posture of which is hardly changed when the Z spindle is moved upward and downward, and having less measurement errors due to hysteresis.

A movement mechanism according to an embodiment of the present invention includes:
  a vertical movement mechanism including an elongated slider having a length in a vertical direction, and a vertical drive unit that moves the elongated slider in the vertical direction; and
  a horizontal movement mechanism that moves the vertical movement mechanism in a horizontal direction, in which
  the vertical drive unit includes:
    an open belt having an upper end fixed near an upper end portion of the elongated slider and a lower end fixed near a lower end portion of the elongated slider;
    a drive pulley provided between the open belt and the elongated slider, and that feeds and drives the open belt upward and downward, the open belt being wound around the drive pulley;
    an upper tension roller arranged higher than the drive pulley and on an opposite side of the open belt from the elongated slider, and that pushes the open belt against the elongated slider; and a lower tension roller arranged lower than the drive pulley and on an opposite side of the open belt from the elongated slider, and that pushes the open belt against the elongated slider, the horizontal movement mechanism includes:
a horizontal guide part having a length in a horizontal direction;
a horizontal slider that slides to move along the horizontal guide part; and
a frame part fixed to the horizontal slider and that supports the vertical drive unit, and the frame part has a substantially cylindrical shape having a cylinder hole guiding the elongated slider, and supports the vertical drive unit at a position facing the horizontal guide part by interposing the elongated slider.

In an embodiment of the present invention, it is preferable that the upper tension roller is provided at a position lower than a height position of an upper end portion of the horizontal guide part.

A vertical movement mechanism according to an embodiment of the present invention includes:
an elongated slider having a length in a vertical direction; and
a vertical drive unit that moves the elongated slider in the vertical direction, in which
the vertical drive unit includes:
an open belt having an upper end fixed near an upper end portion of the elongated slider and a lower end fixed near a lower end portion of the elongated slider;
a drive pulley provided between the open belt and the elongated slider, and that feeds and drives the open belt upward and downward, the open belt being wound around the drive pulley;
an upper tension roller arranged higher than the drive pulley and on an opposite side of the open belt from the elongated slider, and that pushes the open belt against the elongated slider; and
a lower tension roller arranged lower than the drive pulley and on an opposite side of the open belt from the elongated slider, and that pushes the open belt against the elongated slider, and when a distance between the upper end portion of the open belt and the upper tension roller in a height direction at a lower stroke end of the elongated slider is represented as an upper allowable dimension Lu, and a distance between the lower end portion of the open belt and the lower tension roller in the height direction at an upper stroke end of the elongated slider is represented as a lower allowable dimension Ld, Lu>Ld is satisfied.

A measuring machine according to an embodiment of the present invention includes:
the movement mechanism; and
a probe attached to the elongated slider.

DETAILED DESCRIPTION

Embodiments of the present invention are illustrated and described with reference to the reference signs attached to the elements in the drawings.

First Exemplary Embodiment

Figure 8:
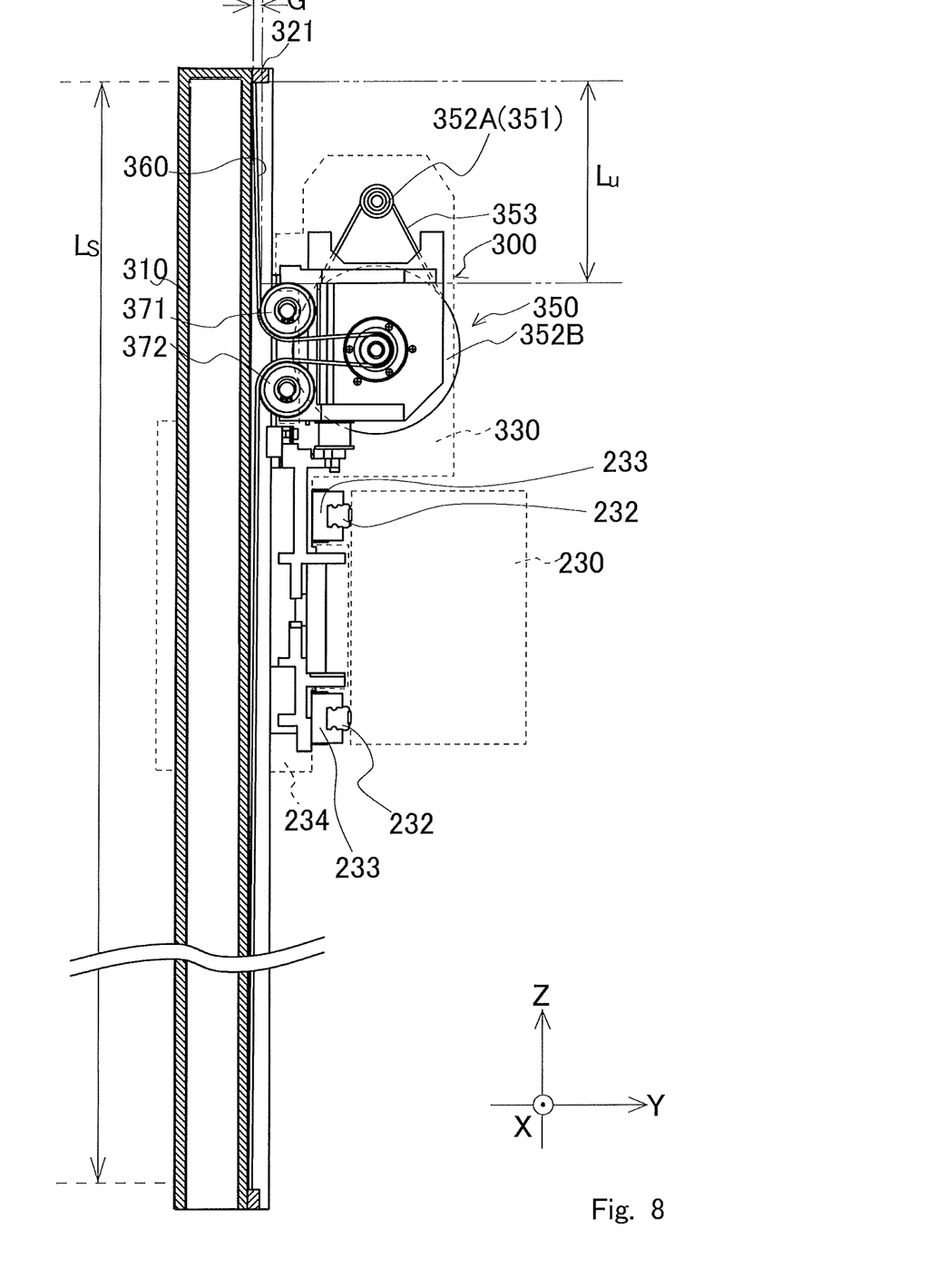
FIG. 8 is a diagram schematically showing a Z spindle at the lower stroke end in a first exemplary embodiment.
Figure 9:
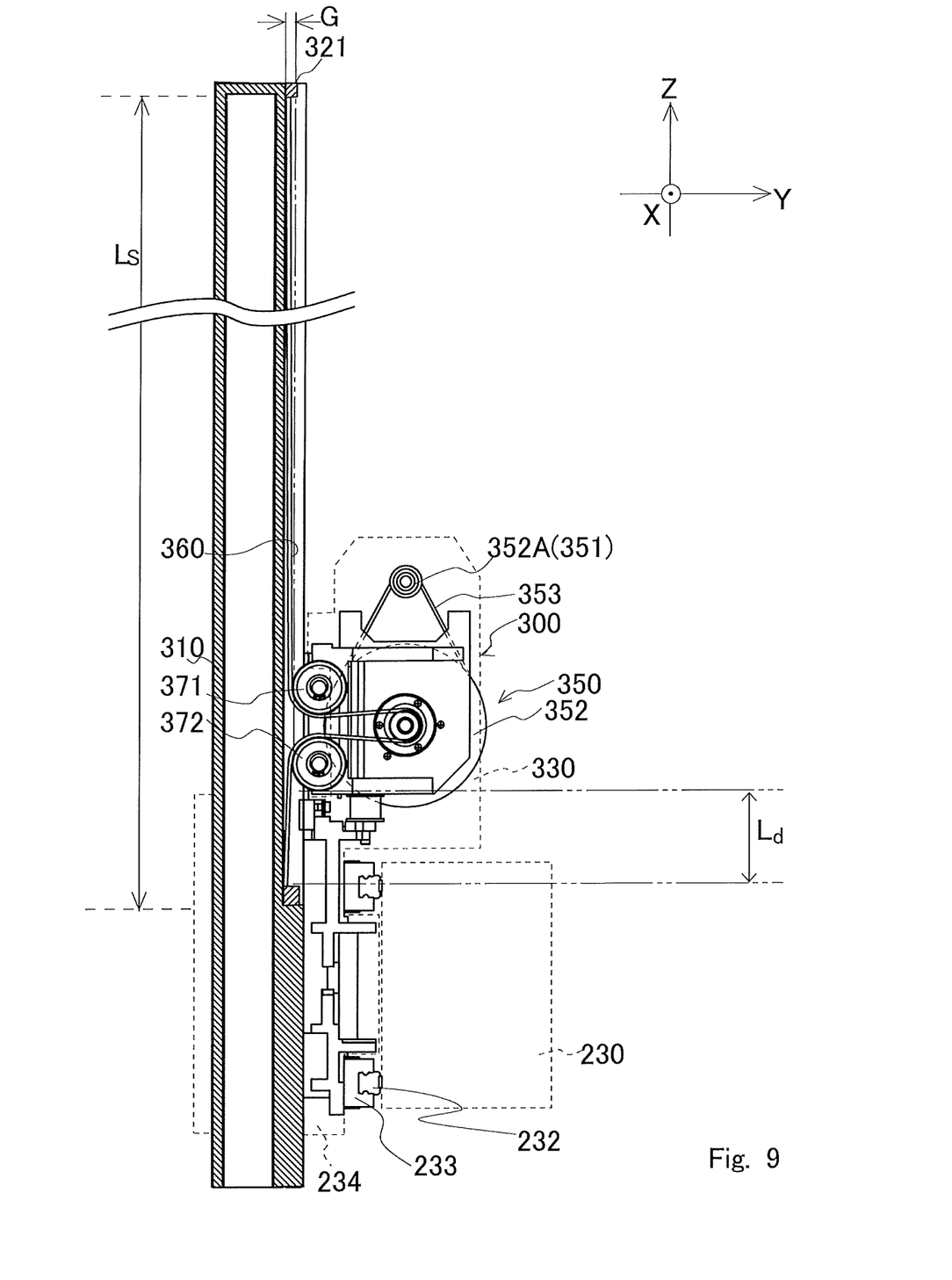
FIG. 9 is a diagram schematically showing the Z spindle at the upper stroke end in the first exemplary embodiment.

A coordinate measuring machine 100 in a first exemplary embodiment of the present invention is described. The basic configuration in the first exemplary embodiment is the same as that described in Description of Related Art. However, the lower limit value is set to the distance between an upper end attachment part 321 of an open belt 360 and an upper tension roller 371 in the Z axial direction when a Z spindle 310 is at the lower stroke end. FIG. 8 is a diagram schematically showing the Z spindle 310 at the lower stroke end. In FIG. 8, the distance between the upper end attachment part 321 of the open belt 360 and the upper tension roller 371 in the Z axial direction at the lower stroke end of the Z spindle 310 is represented by an upper allowable dimension Lu. The distance between the upper end attachment part 321 of the open belt 360 and a lower end attachment part 322 is represented by an effective belt length Ls. FIG. 9 is a diagram schematically showing the Z spindle 310 at the upper stroke end. In FIG. 9, the distance between the lower end attachment part 322 of the open belt 360 and a lower tension roller 372 in the Z axial direction at the upper stroke end of the Z spindle 310 is represented by a lower allowable dimension Ld.

At this time, Lu>Ld is to be satisfied. Preferably, Lu>1.2×Ld is to be satisfied, and more preferably, Lu>1.5×Ld is to be satisfied.

Here, the gap between the tension rollers 371 and 372 and the side face of the Z spindle 310 is represented by G (FIG. 8). Note that, G is a value determined according to the adjustment when the product is assembled. As the upper allowable dimension Lu becomes longer, it is natural that the inclination angle θb of the open belt 360 from the vertical line becomes smaller accordingly near the upper end attachment part 321 when the Z spindle 310 is at the lower stroke end. In normal design, Lu=Ld is to be simply satisfied. In addition, if the Z spindle 310 has the same stroke, in order to reduce the size of the coordinate measuring machine 100 as much as possible, Lu<Ld is desired so that the Z spindle 310 does not protrude upward.

However, as described in Summery of the Invention, the force Fb(=Fzacc+Fzg) applied to the open belt 360 when the Z spindle 310 is moved upward is larger than that when the Z spindle 310 is moved downward. Thus, the angle θb formed by the open belt 360 separated away from the side face of the Z spindle 310 with the vertical line near the upper end attachment part 321 of the open belt 360 when the Z spindle 310 is at the lower stroke end cannot be ignored. In order to prevent hysteresis errors from being generated when measurement is performed near the lower stroke end of the Z spindle 310 while the Z spindle 310 is being moved upward and downward, it is required that at least Lu>Ld is satisfied.

Second Exemplary Embodiment

Next, a coordinate measuring machine 100 according to a second exemplary embodiment of the present invention is described. In the first exemplary embodiment, it has been proposed that Lu>Ld is satisfied. However, in the configuration in the first exemplary embodiment, the Z-axis drive unit 350 is positioned above the X-axis guiding part 231, and it is required to secure the distance Lu (upper allowable dimension) to the upper end attachment part 321 of the open belt 360 above the Z-axis drive unit 350 (FIG. 8). For this reason, in order to fully secure the stroke of the Z spindle 310, a space for a long protrusion needs to be secured above the X-axis guiding part 231, and the size of the coordinate measuring machine 100 is increased. In addition, the Z spindle 310 needs to be lengthened, and the weight of the Z spindle 310 is increased accordingly.

Figure 10:
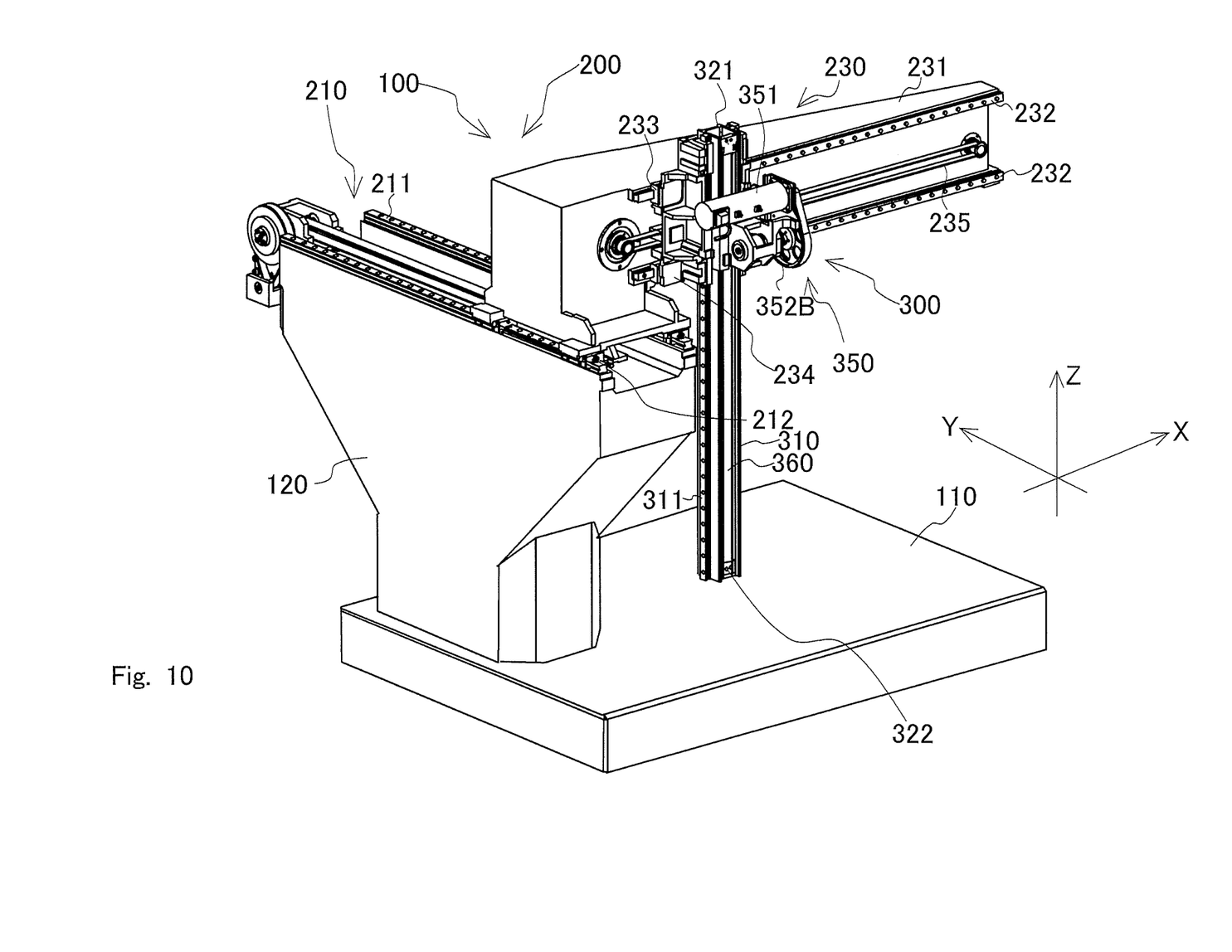
FIG. 10 is a diagram showing an internal configuration of a coordinate measuring machine 100 without a cover in a second exemplary embodiment.
Figure 11:
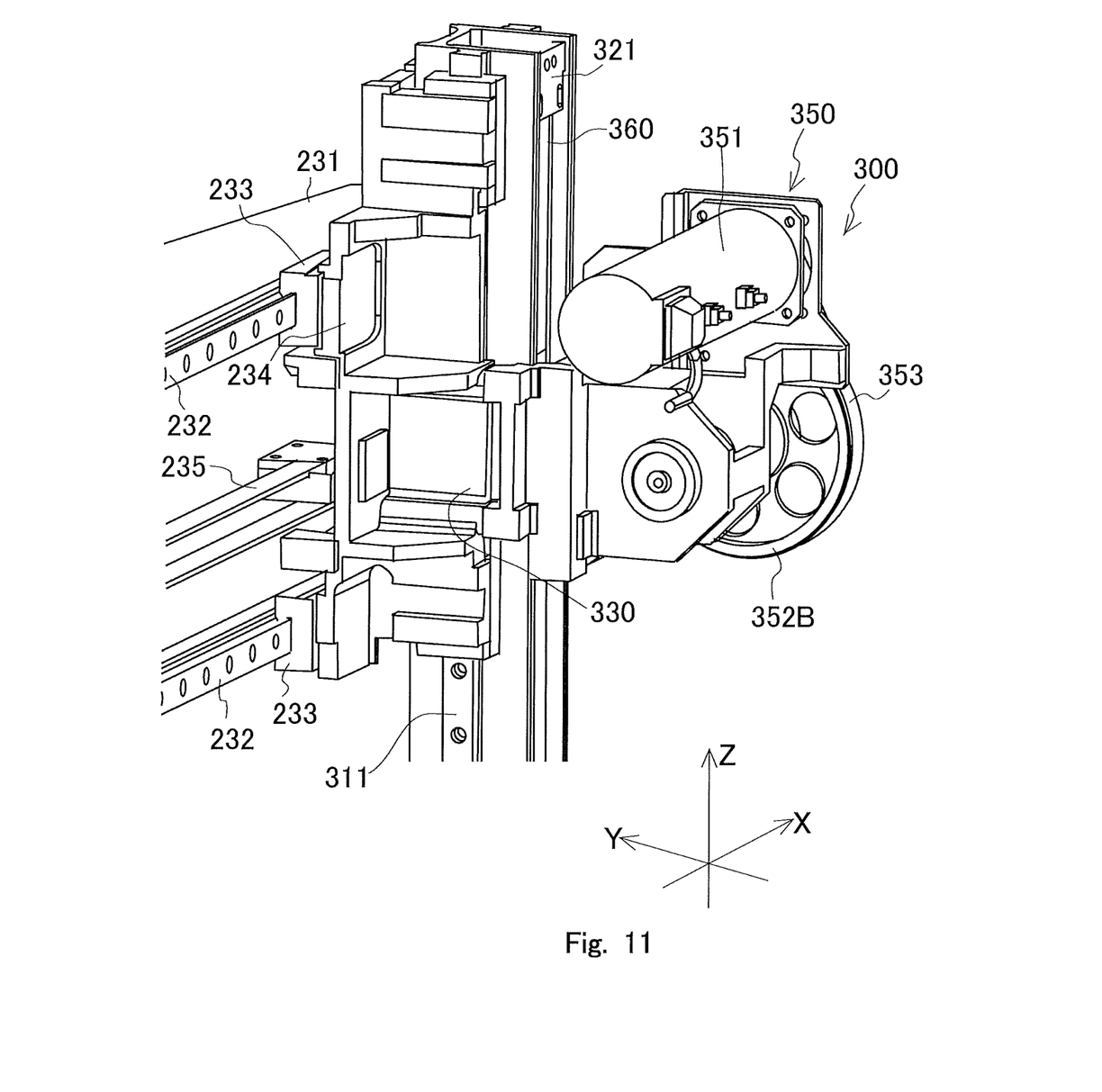
FIG. 11 is a partial enlarged view of FIG. 10, and, in particular, of a Z-axis drive unit.
Figure 12:
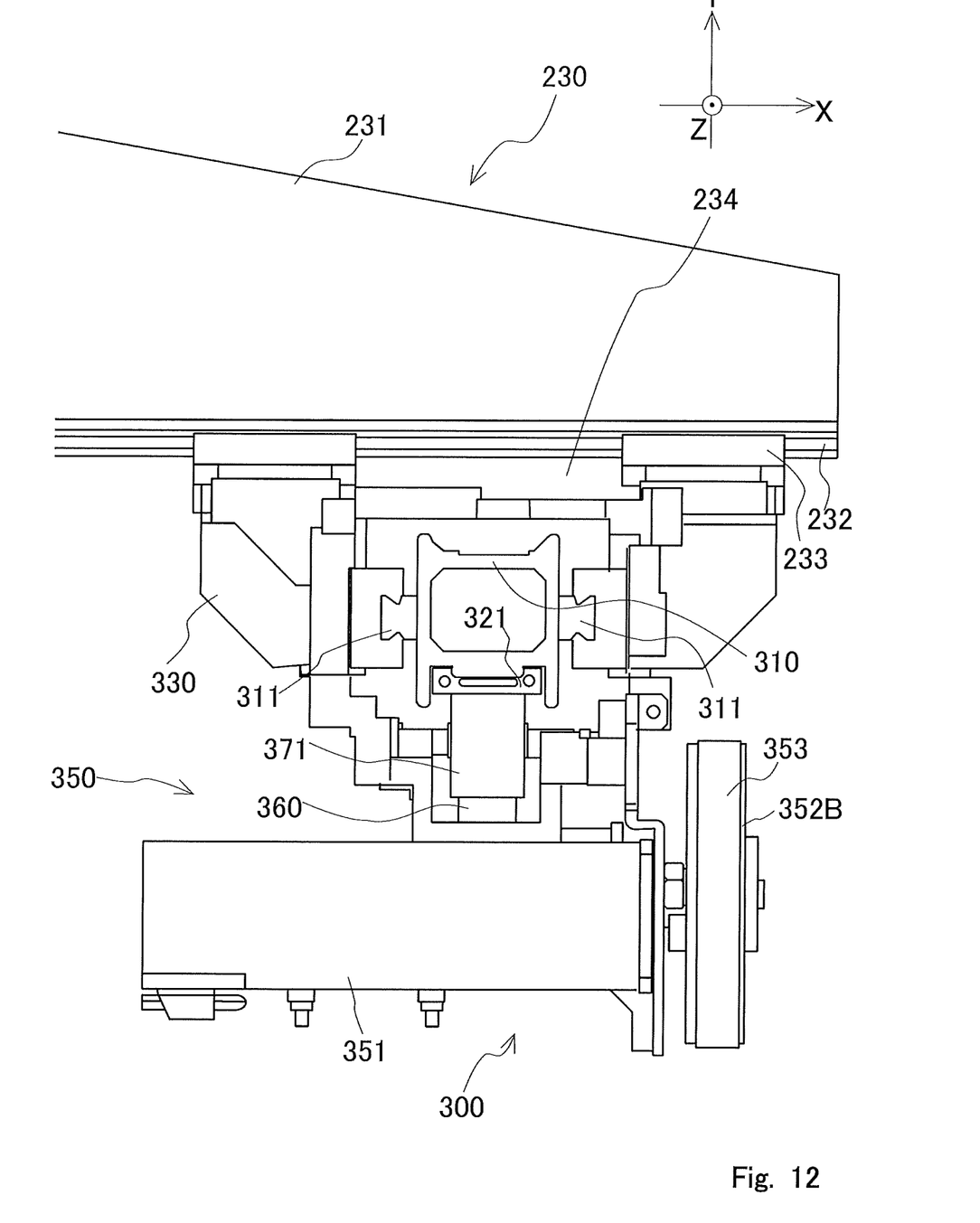
FIG. 12 is a plane view of the Z-axis drive unit viewed from the positive side of the Z direction.

The second exemplary embodiment is shown in FIGS. 10 and 11. FIG. 10 is a diagram showing an internal configuration of a coordinate measuring machine 100 without a cover in the second exemplary embodiment. FIG. 11 is a partial enlarged view of FIG. 10, and, in particular, of an enlarged Z-axis drive unit 350. FIG. 12 is a plane view of the Z-axis drive unit 350 viewed from the positive side of the Z direction.

In the second exemplary embodiment, a Z-axis drive unit 350 is positioned on the opposite side of a Z spindle 310 from an X-axis guiding part 231. The X-axis guiding part 231 has a length in the X axial direction, and guide rails 232 are provided on the surface of the X-axis guiding part 231 on the negative side in the Y axial direction. A movement block 233 having a U-shaped cross section is provided so as to straddle the guide rails 232, and an X slider 234 is attached to the movement block 233. A frame part 330 is provided on the surface of the X slider 234 on the negative side in the Y axial direction. The frame part 330 has a shape having a cylinder hole for inserting the Z spindle 310 thereinto. The Z-axis drive unit 350 is arranged on the surface of the frame part 330 on the negative side in the Y axial direction.

At this time, it is preferable that the height position of the Z-axis drive unit 350 in the Z axial direction is to be right in front of the X-axis guiding part 231, that is, to be the same height as that of the X-axis guiding part 231. In consideration of an upper allowable dimension Lu, an upper tension roller 371 is preferably to be lower than the height position of the upper end portion of the X-axis guiding part 231. For example, it is preferable that the position of the rotation shaft of the upper tension roller 371 is to be lower than the height position of the upper end portion of the X-axis guiding part 231. It is more preferable that the highest portion of the upper tension roller 371 is to be lower than the height position of the upper end portion of the X-axis guiding part 231.

In addition, it is preferable that a motor 351 is arranged higher than a second drive pulley 352B. This is because the heat from the motor 351 is to be released upward. For this reason, it is preferable that the highest portion of the motor 351 is lower than the height position of the upper end portion of the X-axis guiding part 231.

Note that, it is preferable that the lower tension roller 372 is higher than the height position of the lower end portion of the X-axis guiding part 231.

Since the Z-axis drive unit 350 is arranged on the opposite side of the Z spindle 310 from the X-axis guiding part 231, it is natural that the side face of the Z spindle 310 to which the open belt 360 is attached is the opposite side face from the X-axis guiding part 231.

According to the second exemplary embodiment, although a relatively long upper allowable dimension Lu is secured, it is possible to shorten the length of the Z spindle 310 protruding from above the X-axis guiding part 231, and the height size of the coordinate measuring machine 100 can be more reduced. Alternatively, although the upper allowable dimension Lu is secured, the height size can be more reduced than that in a conventional technique.

In addition, since the position of the Z-axis drive unit 350 is lowered, the center of gravity of the Z-axis movement mechanism 300 is lowered. Then, considering the Z-axis movement mechanism 300 and the X-axis movement mechanism 230 as a whole, it is possible to bring the height of the center of gravity of the movable part (the X slider 234) of the X-axis movement mechanism 230 close to the height of the drive mechanism (here, the endless belt 235) of the X-axis movement mechanism 230. Thus, the movement accuracy (for example, the straightness of movement) of the X slider 234 of the X-axis movement mechanism 230 is improved.

Furthermore, since the installation height of the Z-axis drive unit 350 is lower than that in a conventional technique, the center of gravity of the coordinate measuring machine 100 is lowered, and the stability when the coordinate measuring machine 100 is installed on a machine stand is improved.

Note that, Lu>Ld may be satisfied in the second exemplary embodiment, but this is not necessarily limited.

The lower limit value of the upper allowable dimension Lu is not determined only by the relation with the lower allowable dimension Ld, and θb is only required to be sufficiently small. In order to arrange the Z-axis drive unit 350 right above the X-axis guiding part 231, a design concept that Lu is consciously lengthened (for example, Lu>Ld or the like) is required to be employed. However, by arranging the Z-axis drive unit 350 right in front of the X-axis guiding part 231 like in the second exemplary embodiment, Lu is naturally secured with some allowance (for example, 50 mm or more), and it is not necessary to place a limit such as Lu>Ld.

Note that, the present invention is not limited to the above embodiments, and can be appropriately changed without departing from the scope.

The invention claimed is:

1. A movement mechanism comprising:
a vertical movement mechanism comprising an elongated slider having a length in a vertical direction, and a vertical drive unit configured to move the elongated slider in the vertical direction; and
a horizontal movement mechanism configured to move the vertical movement mechanism in a horizontal direction, wherein
the vertical drive unit comprises:

an open belt having an upper end fixed near an upper end portion of the elongated slider and a lower end fixed near a lower end portion of the elongated slider;

a drive pulley provided between the open belt and the elongated slider, and configured to feed and drive the open belt upward and downward, the open belt being wound around the drive pulley;

an upper tension roller arranged higher than the drive pulley and on an opposite side of the open belt from the elongated slider, and configured to push the open belt against the elongated slider; and a lower tension roller arranged lower than the drive pulley and on an opposite side of the open belt from the elongated slider, and configured to push the open belt against the elongated slider, the horizontal movement mechanism comprises:

a horizontal guide part having a length in a horizontal direction;

a horizontal slider configured to slide to move along the horizontal guide part; and a frame part fixed to the horizontal slider and configured to support the vertical drive unit, and the frame part has a substantially cylindrical shape having a cylinder hole guiding the elongated slider, and supports the vertical drive unit at a position facing the horizontal guide part by interposing the elongated slider.

2. The movement mechanism according to claim 1, wherein the upper tension roller is provided at a position lower than a height position of an upper end portion of the horizontal guide part.

3. A vertical movement mechanism comprising:

an elongated slider having a length in a vertical direction; and a vertical drive unit configured to move the elongated slider in the vertical direction, wherein the vertical drive unit comprises:

an open belt having an upper end fixed near an upper end portion of the elongated slider and a lower end fixed near a lower end portion of the elongated slider;

a drive pulley provided between the open belt and the elongated slider, and configured to feed and drive the open belt upward and downward, the open belt being wound around the drive pulley;

an upper tension roller arranged higher than the drive pulley and on an opposite side of the open belt from the elongated slider, and configured to push the open belt against the elongated slider; and a lower tension roller arranged lower than the drive pulley and on an opposite side of the open belt from the elongated slider, and configured to push the open belt against the elongated slider, and when a distance between the upper end portion of the open belt and the upper tension roller in a height direction at a lower stroke end of the elongated slider is represented as an upper allowable dimension Lu, and a distance between the lower end portion of the open belt and the lower tension roller in the height direction at an upper stroke end of the elongated slider is represented as a lower allowable dimension Ld, Lu>Ld is satisfied.

4. A measuring machine comprising:
the movement mechanism according to claim 1; and
a probe attached to the elongated slider.

5. A measuring machine comprising:
the movement mechanism according to claim 3; and
a probe attached to the elongated slider.

* * * * *